INVENTORS
EVERETT H. PLACKE &
HOWARD A. MULLEN

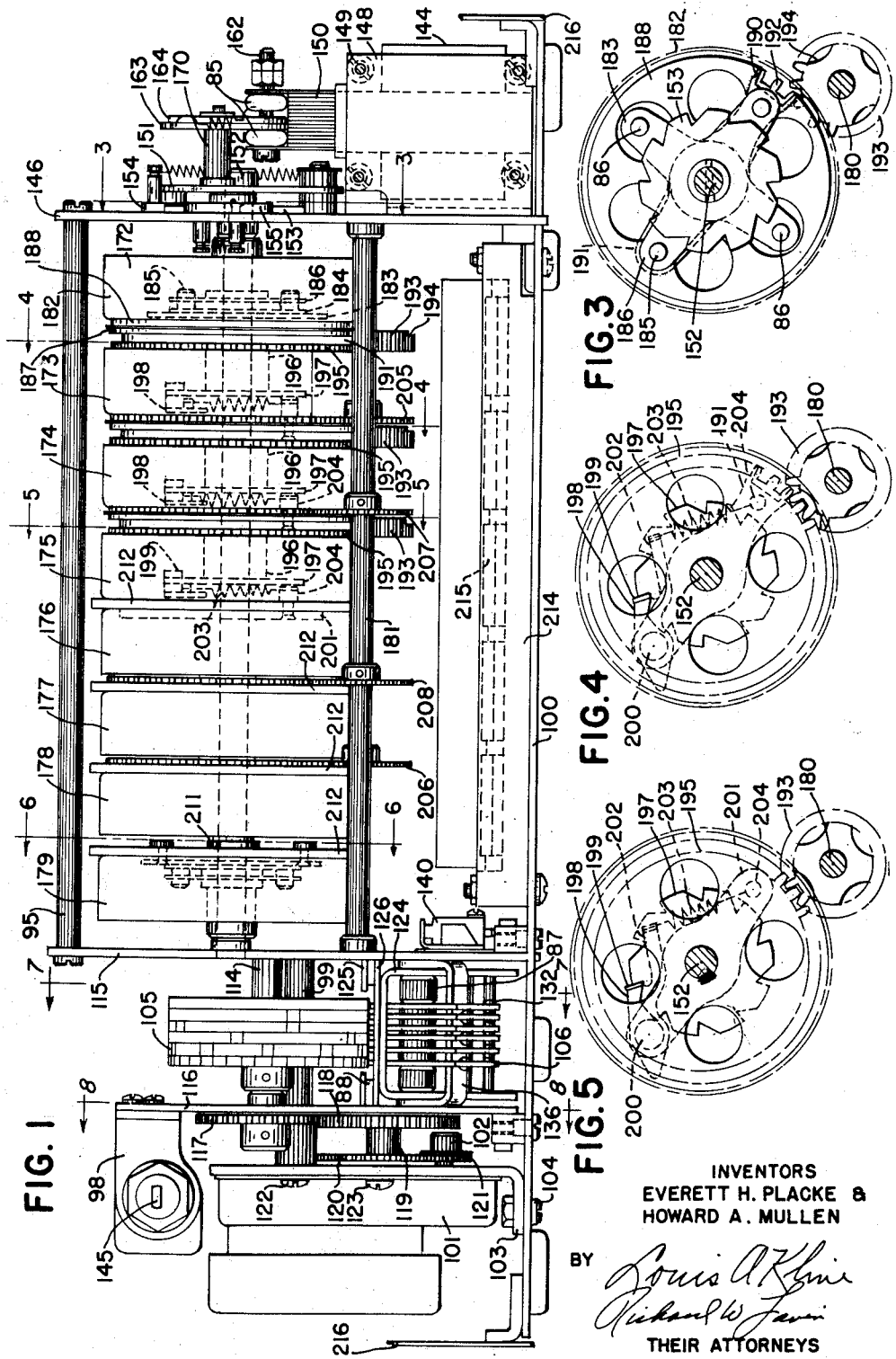
Feb. 13, 1962 — E. H. PLACKE ET AL — 3,021,057
RATE DEVICES
Filed Sept. 9, 1960 — 3 Sheets-Sheet 1
INVENTORS
EVERETT H. PLACKE &
HOWARD A. MULLEN
THEIR ATTORNEYS Feb. 13, 1962  E. H. PLACKE ET AL  3,021,057
RATE DEVICES
Filed Sept. 9, 1960  3 Sheets-Sheet 2
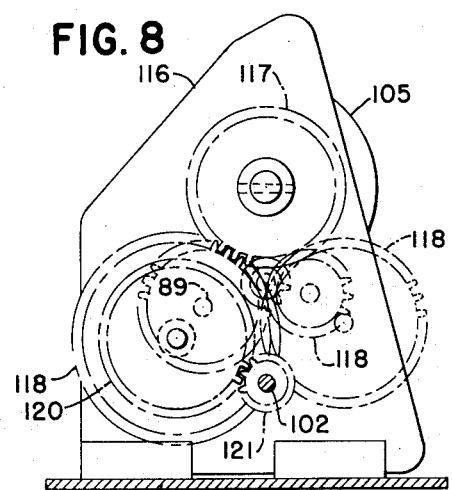
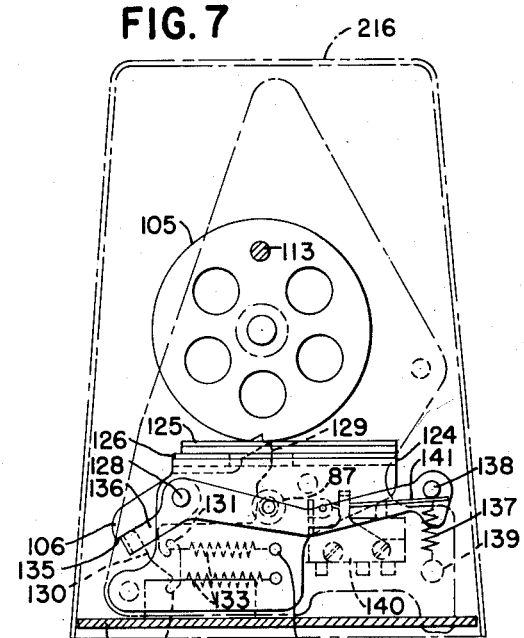
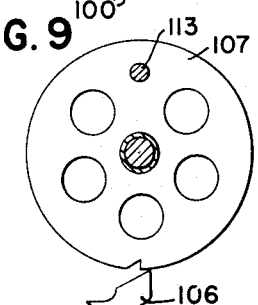
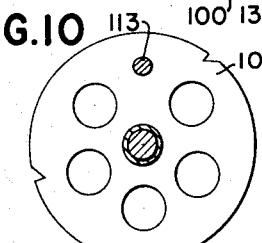
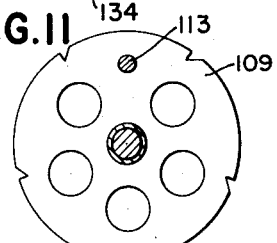
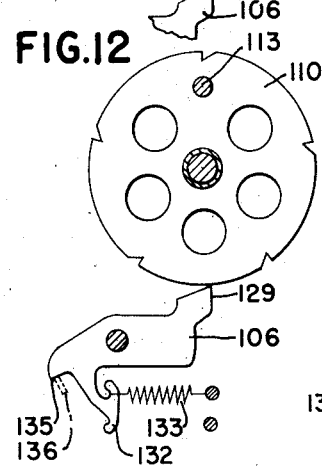
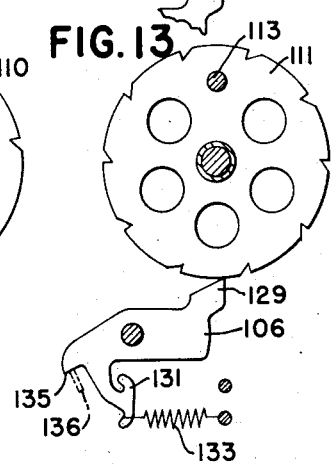
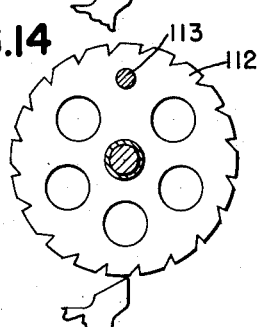
INVENTORS
EVERETT H. PLACKE &
HOWARD A. MULLEN
BY
THEIR ATTORNEYS Feb. 13, 1962 E. H. PLACKE ET AL 3,021,057
RATE DEVICES
Filed Sept. 9, 1960 3 Sheets-Sheet 3

BY *Louis A. Kline*
*Richard W. Lavin*
THEIR ATTORNEYS

United States Patent Office 3,021,057
Patented Feb. 13, 1962

3,021,057
RATE DEVICES
Everett H. Placke and Howard A. Mullen, Dayton, Ohio, assignors to The National Cash Register Company, Dayton, Ohio, a corporation of Maryland
Filed Sept. 9, 1960, Ser. No. 54,865
6 Claims. (Cl. 235—61)

This invention relates to improvements in a variable rate computing mechanism, and more particularly relates to a novel means for changing the rates on said mechanism. The invention is applied to a mechanism which will indicate an elapsed length of time in terms of a currency total, and which is used in conjunction with a cash register or any other type of accounting machine.

In those business transactions where a commodity is rented at a currency charge per hour or fraction thereof, it has always been required of the proprietor to calculate the time that is to be charged, and then to compute the amount due. In certain businesses, the rate to be charged may vary throughout the day, and thus the computation of such charges becomes a laborious task, with the prospect of a miscalculation present at every charge. The present invention contemplates a rate mechanism which will calculate an amount of currency based on a currency charge per time element, and which will continually indicate a total amount of currency, based on the time that has elapsed. A problem which has arisen in the past is that in those businesses where rates may vary throughout the day, no simple arrangement has ever been provided which allows the proprietor to adjust the rates on the mechanism in a relatively simple manner. It is, therefore, an object of this invention to provide such a rate-computing mechanism with means for adjusting the rates of such mechanism which is simple in its design and reliable in its operation.

With this and incidental objects in view, the invention includes certain novel features of construction and combinations of parts, a preferred form or embodiment of which is hereinafter described with reference to the drawings which accompany and form a part of this specification.

Referring to the drawings:

FIG. 1 is a front elevational view of the rate mechanism with the cabinet removed, showing the indicator wheels with the clock mechanism and control gears located on the left and the drive mechanism located on the right side of the indicator wheels;

FIG. 3 is a detailed vertical sectional view taken on line 3—3 of FIG. 1;

FIG. 4 is a detailed vertical sectional view taken on line 4—4 of FIG. 1;

FIG. 5 is a detailed vertical sectional view taken on line 5—5 of FIG. 1;

FIG. 7 is a detailed vertical sectional view taken on line 7—7 of FIG. 1, showing the control section of the rate mechanism;

FIG. 8 is a detailed vertical sectional view taken on line 8—8 of FIG. 1, showing the idling gear arrangement for varying the driving speed of the rate mechanism;

Figure 15:
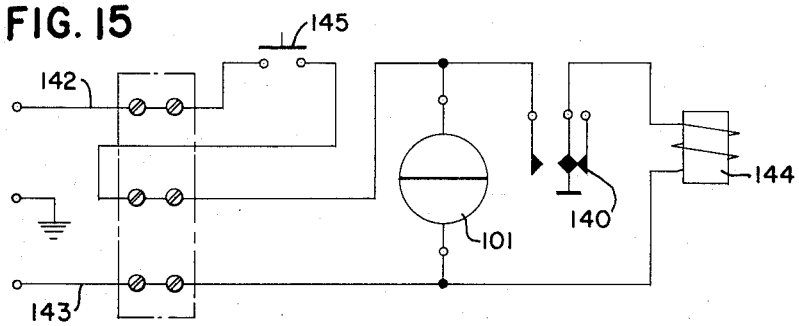
Figure 16:
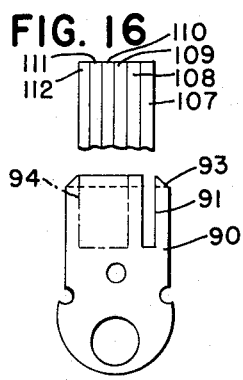

FIGS. 9, 10, 11, 12, 13, and 14 are detailed views of the selector disks that make up the selecting line;

FIG. 15 is a schematic diagram of the electrical circuit for the rate mechanism; and FIG. 16 is a detailed view of a rate key.

The rate-computing mechanism disclosed herein comprises essentially a series of indicator wheels, a solenoid-operated drive mechanism for driving said indicator wheels, and a control section for operating said solenoid. The control section consists essentially of a series of selector disks driven at a predetermined speed, each selector disk containing a specific number of notches, and sensing means associated with each selector disk for sensing each of the notches, thereby actuating the solenoid for advancing the indicator wheels. Key means are provided which, when inserted into the control section, will select one or more of the selector disks for controlling the operation of the solenoid, thereby providing the mechanism with a predetermined rate.

Referring now to the drawings, there is shown in FIG. 1 the rate mechanism, comprising a base member 100, upon which the mechanism is supported. Located on the left-hand side of the mechanism is a timing motor 101, having a drive shaft 102, journaled in a motor frame 103, attached to the base 100 by means of screws 104, as shown in FIG. 1. The timing motor is of a hysteresis type, arranged to have an output of one revolution per minute.

Assiocated with the motor is the rate control section of the mechanism, located adjacent the motor and consisting essentially of a selecting line 105 (FIGS. 1 and 8) and a series of sensing pawls 106 associated with the selecting line. Referring to FIG. 1, the selecting line 105 is shown to be made up of six selector disks (FIGS. 9 to 14 inclusive), each disk having an associated sensing pawl 106 and each containing a predetermined number of notches. Referring to FIGS. 9 to 14 inclusive, the disk 107 has one notch, the disk 108 has two notches, the disk 109 has four notches, the disk 110 has five notches, the disk 111 has ten notches, and the disk 112 has twenty notches. Each notch is located on a nine-degree radial line in such a way that, when all the disks are joined together by means of a rivet 113 to form the selecting line 105, the disks are so positioned that a notch will be in a sensing position a maximum number of forty times during each revolution of the selecting line. As will be explained hereinafter, each time a notch is sensed, the indicator wheels are driven to provide an addition of one cent to the total shown on the indicators. If the selecting line is driven at five revolutions per hour, a total of two dollars will be added to the total, assuming that all six selector disks are in operating position. Thus the rate at which the mechanism will operate is controlled by the number of notches sensed per revolution of the selecting line, and the number of revolutions per hour the selecting line is driven by the motor 101.

Located between the motor 101 and the selecting line 105 is a reduction gear train for varying the rate of rotation of the selecting line 105. As may be seen from FIG. 1, the selecting line 105 is pinned to a shaft 114, rotatably supported between the left indicator side frame 115 and the selector frame 116. Inserted between these frames is a spacer 99. Pinned to the left end of the shaft 114 is a gear 117. Associated with the gear 117 is a ratio gear 118, which transmits the driving motion of the timing motor to the selecting line 105. The ratio gear 118 is mounted on one end of a hub 119 (FIG. 1), to which is mounted a gear 120. The gear 120 meshes with a gear 121, mounted on the drive shaft 102 of the timing motor 101.

Referring to FIG. 8, there is shown the selector frame 116, containing a series of holes 89, into which are inserted various ratio gears which control the rotational speed of the selecting line 105. As shown, the gear 120, which engages the drive shaft gear 121, is of a constant diameter on each series of ratio gears, but the ratio gear 118, which engages the selecting line gear 117, varies in diameter, as shown in FIG. 8. To mount the particular ratio gear, the motor 101 and the motor frame 103 are removed by loosening the screws 104, 122, and 123, and then inserting the required ratio gears. By this means, speeds of five, ten, fifteen, twenty, and twenty-five revolutions per hour are available for rotation of the selecting line. This results in the changing of the rate of operation of the mechanism in five-cent, ten-cent, fifteen-cent, twenty-cent, and twenty-five-cent increments, respectively, as will be explained more fully hereinafter. It is obvious that the above rotational values are purely arbitrary and that any rotational speed may be chosen to insure a proper rate for the mechanism.

Referring to FIGS. 1 and 7, there is supported between the selector frame 116 and the left indicator frame 115 a shaft 128. Mounted on this shaft is a support yoke 124, the top of which has welded thereto a member 88, having a bent-over flange 125, forming a slot with a surface 126 of this member. The slot acts as a key guide in the rate-controlling operation, which is explained hereinafter. Pivotally supported by the shaft 128 is the plurality of sensing pawls 106 (FIG. 7), there being one pawl for each selector disk of the selecting line, as previously explained.

As may be seen from FIG. 7, each pawl has a forward pointer 129, which is located adjacent the outer peripheral surface of its associated selector disk. The other end of the pawl has a lower extension 130, having an upper arm 131 (FIG. 13) and a lower arm 132 (FIG. 12). Attached to one of the arms is a spring 133, the other end of which is attached to a stud 134, located in the side of the yoke 124. As may be seen from FIGS. 1, 12, and 13, the springs 133 are alternated between the lower and upper arms of each succeeding pawl, thus providing sufficient room for their operation. Action of the spring 133 biases the pawl 106 counter-clockwise (FIG. 7) about the shaft 128, thereby urging the pointed end 129 of the pawl into engagement with its associated selector disk. Located adjacent the front part of the pawls 106 (FIG. 7), and supported between the sides of the support yoke 124, is a pawl guide 87, for positioning the pawls adjacent their respective actuator disks.

The lower extension 130 of each pawl 106 has a surface 135 (FIGS. 7, 12, and 13), extending in a rearward direction. Associated with the pawl is a switch yoke 136, the yoke portion of which engages the surface 135 of each of the sensing pawls 106. The forward end of the switch yoke is biased in a downward direction by a spring 137, connected between a stud 138, mounted on the end of the switch yoke, and a stud 139, mounted on the left indicator side frame 115.

Mounted on the lower portion of the left indicator side frame is a micro-switch 140 (FIG. 1), having a switch arm 141. As seen in FIG. 7, the switch arm 141 is engaged by the stud 138 of the switch yoke 136 and is normally biased in an open position by the action of the spring 137. Whenever a sensing pawl 106 senses a notch in its associated selector disk during the rotation of the selecting line 105, the pawl will rotate counter-clockwise, which results in the switch yoke 136 being rocked counter-clockwise, which releases the pressure on the switch arm 141, thus allowing the switch arm 141 to close the micro-switch 140.

Referring to FIG. 15, there is shown a schematic diagram of the electrical system of the rate mechanism. Conductors 142 and 143 are shown connected to a suitable A.C. power source. In this case, the conductors are connected to an outlet contained in the associated cash register or accounting machine. Connected across the conductors are the timing motor 101 and a solenoid 144. Located in the line 142 is an on-off switch 145, located on a flange 98 attached to the selector frame 116 (FIG. 1). Also located in the line 142 is the micro-switch 140. When the micro-switch is closed upon the sensing of a notch by a pawl 106, an energizing circuit is completed to the solenoid 144, which rotates the indicator wheels in a manner described hereinafter. Thus, whenever a notch in a selector disk is sensed by any of the pawls 106, the micro-switch 140 is closed, thereby energizing the solenoid 144, which moves the indicator wheels an appropriate distance to show the addition of one cent to the total indicated.

In the arrangement described above, a notch will be sensed forty times per revolution of the selecting line, due to the cumulative number of notches that are contained in the six selector disks comprised in the selecting line 105. The selecting line in this example is geared to make five revolutions per hour, which results in a total of two hundred energizing pulses being sent to the solenoid 144. Assuming that each pulse will advance the indicator wheel one cent, a total of two dollars will be added to the amount already set up in the indicator wheels. It will be seen that this amount may vary, depending on the ratio gears inserted between the motor and the selecting line, as described previously. Thus, if the selecting line is rotated at ten revolutions per hour, a total of four hundred pulses, or four dollars, will be added to the indicators. From this it may be seen that the rate can be increased for each revolution that the selecting line is increased.

To provide a greater number of rates that may be made available to the machine, there is shown in FIG. 16 a key 90, having a slot 91. The tip of the key has a beveled end 93. Adjacent the key in FIG. 16 is shown a section of the selecting line 105, showing the selector disks 107 to 112 inclusive, which constitute the selecting line 105. It will be seen that the slot 91, contained in the key 90, in opposite the disk 107. The key is inserted by the operator into the slot formed by the flange 125 (FIG. 7) of the member 88 (FIG. 1). The key is so positioned in the slot that the beveled end 93 of the key is adjacent the selector disks and engages the sensing pawls 106, thereby preventing the pawls 106 from sensing the notches in the selector disk. Only those pawls and disks which correspond to a slot contained in the key will be in an operable position. It will thus be seen that any combination of disks may be chosen, depending on how the key is slotted, with the result that the rate may vary from one cent to forty cents per revolution of the selecting line, depending upon which selector disks are in operating position. As shown in FIG. 16, the key will block out all of the selector disks except disk 107, which will advance the indicator wheel one cent per revolution of the selecting line. If the selecting line has been geared to rotate at five revolutions per hour, the resulting rate would be five cents per hour. If the key had an additional cut-out, as indicated by the dotted line 94, the only disk that would be disabled would be the disk 108, which would result in the indicator's showing an addition of thirty-eight cents per revolution of the selecting line, or a rate of $1.90 per hour. Thus the rate of the mechanism will automatically be controlled by the insertion of one key. Located on the base 100 (FIG. 1) is a key housing 214, having compartments 215 to provide storage for upward to five additional rate keys. Since the selector line has five different operating speeds, there are made available to the mechanism rates ranging from five cents per hour to ten dollars per hour, depending on the selector disks that are chosen to be in operating position, and on the driving speed of the selecting line.

Figure 2:
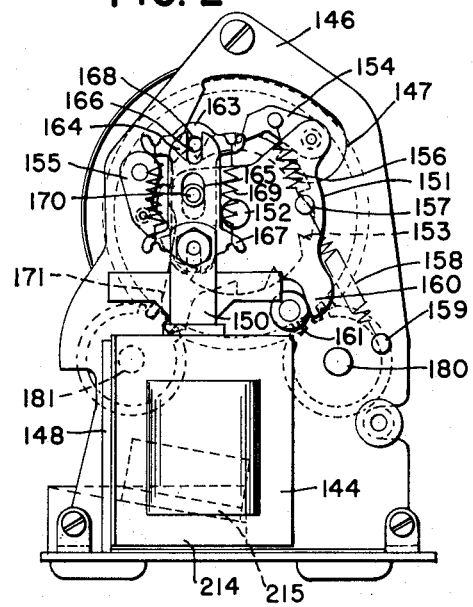
FIG. 2 is a side elevational view, as observed from the right of the machine, showing the solenoid drive mechanism for the indicator wheels.

Referring to FIGS. 1 and 2, located on the right-hand side of the mechanism are the solenoid 144 and the indicator drive mechanism. As shown, mounted on the base 100 is a right indicator frame 146, having therein a slot 147 (FIG. 2). A tie rod 95 is positioned between the left and right indicator frames for support. Attached to the right indicator frame 146 is a bracket 148, to which is mounted the solenoid 144 by means of screws 149. The solenoid has a plunger 150, having a recessed end, as shown in FIG. 1.

Located adjacent the solenoid is a drive arm 151

(FIG. 2), freely mounted on the indicator drive shaft 152. Pinned to this shaft, and located adjacent the drive arm 151, is a ratchet wheel 153 (FIG. 2). Engaging the ratchet wheel are two ratchet pawls. One pawl, 154, is pivotally supported on the drive arm 151 (FIG. 2), while the other pawl, 155, is pivotally mounted on the right indicator frame 146. A spring 156, attached to a stud 157, mounted on the drive arm, normally urges the ratchet pawl 154 into engagement with the ratchet wheel 153 to act as a driving means for the ratchet wheel. Another spring, 158, attached to a stud 159, located on the right indicator frame 146, urges the drive arm 151 clockwise, thereby moving a lower extension 160 of the drive arm into engagement with a stud 161, located on the right indicator frame 146. This engagement with the stud 161 controls the extent of movement of the drive arm 151 during a resetting operation of the drive arm, as explained hereinafter.

Attached to the recessed end of the solenoid plunger 150 by means of a screw 162 are a pair of links 163 and 164. Each of the links is identical in design, so that each contains a middle slot 165, an end slot 166, and a pair of arms 167, extending from the sides, and a hole 168, located intermediate the two arms 167. As shown in FIG. 2, the two links are reversed in location, with springs 169 interconnecting between an arm of each of the links. A stud 170, mounted on the drive arm 151, is positioned within the middle slot of the links 163 and 164 and is held in a locked position by the action of the springs 169 on the links. Thus, when the solenoid 144 is energized, the plunger will move in a downward direction. To cushion the shock of the plunger as it reaches the end of its movement, two rubber grommets 85 (FIG. 1) are mounted on the screw 162, adjacent the links 163 and 164. This movement is transmitted to the drive arm 151 through the links 163 and 164, resulting in the drive arm's being rotated counter-clockwise. This movement continues until a lower extension 171 of the drive arm, similar to the extension 160, described previously, engages the stop 161. During this movement, the pawl 154 will have rotated the ratchet wheel 153 a like distance, resulting in the indicator wheels' being rotated to show the addition of one cent to the amount set up on the indicators.

Upon the dennergization of the solenoid 144, the drive arm 151 will be rotated clockwise under the action of the spring 158 until the lower extension 160 of the drive arm engages the stop 161. It will be seen that the pawl 155 acts as a stop for the ratchet wheel, allowing the ratchet wheel to be moved only in a counter-clockwise direction.

The group of indicators used in the rate mechanism is shown in FIG. 1. It generally consists of two groups of indicators located between the left (115) and right (146) indicator frames. One group of indicators faces the front of the machine, for the benefit of the customer, while the other group of indicators faces the back, for the benefit of the operator. In FIG. 1, indicators 172 and 179 are the cent indicators; indicators 173 and 178 are the dime indicators; indicators 174 and 177 are the dollar indicators; while indicators 175 and 176 are the ten-dollar indicators. The back indicators 172 to 175 inclusive face the operator, while the front indicators 176 to 179 inclusive face the customer.

Journaled between the left and right indicator frames is the drive shaft 152, which is driven by the ratchet wheel 153, as previously described. Also journaled between the frames are the front (180) and back (181) (FIG. 2) pinion shafts. Generally, both of the cent indicators are pinned to the drive shaft 152, while each of the remaining indicators, with the exception of the ten-dollar indicators, is driven by its preceding indicator through the pinion shaft, as will be described hereinafter. The ten-dollar indicators are attached to each other, which results in the ten-dollar indicator of the back group directly driving the ten-dollar indicator of the front group.

Referring to FIGS. 1 and 3, there are disclosed the cent indicators, which consist of indicator blanks 182, upon which are located, on their peripheral surfaces, the numerals 0 to 9 inclusive, not specifically shown. Mounted on the inside of the indicator blank are two indicator drive arms, 183 and 184, positioned perpendicularly to each other, as shown in FIG. 3. The arm 183 is attached to the indicator blank 182 by means of studs 86. The arm 184 has two studs 185, to which is mounted another drive arm 186, identical in design to arm 184. The arm 186 is pinned to the drive shaft 152, thus providing a rigid connection between the indicator blank 182 and the drive shaft 152. The cent indicator 179 has a similar arrangement.

Attached to the left side of the indicator blank 182 (FIG. 1) of the cent indicator are two transfer gear locks 187 and 188, separated by a spacer 189. As seen in FIG. 3, the gear locks have a cut-out 190 on their peripheral edge. Associated with the gear locks is a transfer segment 191, having, at one of its ends, a set of gear teeth 192, positioned adjacent the cut-out 190 (FIG. 3). The transfer segment is mounted on the indicator by means of studs, not specifically shown, in such a way that, when the indicator is rotated from a "9" position to a "zero" position, the gear teeth 192 of the transfer segment engage and turn a transfer pinion 193, loosely supported on the front pinion shaft 180 (FIG. 3). Referring to FIGS. 1 and 3, it may be seen that the transfer pinion 193 has a series of cut-outs 194 located on one side of the pinion. The other side of the pinion engages a gear 195 (FIG. 1), attached to the dime indicator blank 173. Thus, when the cent indicator 172 is turned from "9" to "0," the dime indicator blank 173 is turned one unit by the transfer pinion 193. During the rotation of this transfer segment after the actual transfer has occurred, the peripheral edge of the gear lock 187 engages the cut-out 194 of the transfer pinion, thus preventing the rotation until it is engaged by the transfer segment 191, at which time the cut-out 190 of the gear lock will be adjacent the cut-out 194 of the transfer pinion. This arrangement is used to transfer between the dime indicator 173 and the dollar indicator 174, and between the dollar indicator 174 and the ten-dollar indicator 175.

All of the dime, dollar, and ten-dollar indicator blanks are of similar construction and are shown in FIGS. 4 and 5. Each indicator is provided with a counter drive gear 195 (FIG. 1), mounted on a hub 196, the other end of which has a drive ratchet wheel 197 attached thereto. Each counter drive gear 195 engages a transfer pinion 193 for movement of the indicator upon a transfer operation by the previous indicator. This movement is transferred to the indicator by means of a transfer arm 198 (FIG. 4), having a flange 199, engaging the ratchet wheel 197. The transfer arm 198 is attached to the transfer segment 191 (FIG. 4) by means of a stud 200, located on the transfer segment in the case of the dime and dollar indicators. The transfer arm 198 is mounted, by means of studs 200, on an indicator drive arm 201 (FIG. 5) in the case of the ten-dollar indicator. Since the ten-dollar indicator is the highest denomination in the indicator group, no transfer mechanism is required, and, as seen in FIG. 1, the studs 200 and 204 on the indicator drive arm 201 join both ten-dollar indicators of the front and back indicator group together. In the case of the dime and dollar indicators, the transfer segment 191 is also mounted on the indicator blank by means of the studs 200 and 204.

To provide a positive engagement between the transfer arm 198 and the drive ratchet wheel 197, the transfer arm has a lower extension 202, engaged by a spring 203, which urges the transfer arm flange 199 into engagement with the ratchet wheel 197. The other end of the spring is attached to the stud 204 mounted either to the transfer segment 191 or to the transfer drive arm 201, depending on the indicator involved. It may be seen from this arrangement that each indicator, other than the cent and the ten-dollar indicators, is driven by the transfer pinion 193 during a transfer operation of the previous indicator.

To transfer the driving motion of the back indicators to the front indicators, a series of transmission pinions are located on the front pinion line 180 and the back pinion line 181. As shown in FIG. 1, the pinions 205 and 206, pinned to the front pinion line 180, drive the dollar indicators, while the pinions 207 and 208, pinned to the back pinion line 181, drive the dime indicators. Each of the pinions associated with the back indicators engages the transfer gear locks 188 of its associated indicator, thus being actuated as the back indicators are operated.

Figure 6:
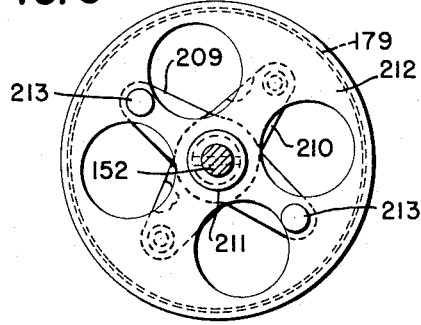
FIG. 6 is a detailed vertical sectional view taken on line 6—6 of FIG. 1.

In FIG. 6 is shown an end view of the front cent indicator. Shown are two indicator drive arms 209 and 210, mounted on a hub 211. The hub 211 is pinned to the drive shaft 152. The indicator blank 179 and a reset disk 212 are attached to the drive arm by means of studs 213. Manual movement of the reset disk 212 rotates the indicator 179 counter-clockwise in a resetting operation. This counter-clockwise movement of the indicators allows the transfer arms 198 (FIG. 4) to be disengaged from the ratchet wheels 197, thereby allowing the indicators to be reset. It may be seen in FIG. 1 that each of the front indicators has a reset disk 212. The resetting operation of the front indicators is transferred to the rear indicators through the transmission pinions and the pinion shafts, in the case of every indicator except the cent indicators, which are transferred by means of the drive shaft 152, and the ten-dollar indicators, which are locked together. It will thus be seen that the resetting of any of the front indicators will automatically reset their corresponding back indicators in the same manner as described above.

The rate mechanism is enclosed within a cabinet 216 (FIGS. 1 and 7). A hinged door, not specifically shown, is located on the back side of the cabinet. This door allows access to the selector line 105 and to the key housing 214, for changing the gearing of the selector line drive 105 and to insert different rate keys for controlling the rate of operation of the mechanism, as described previously.

While the form of mechanism shown and described herein is admirably adapted to fulfill the objects primarily stated, it is to be understood that it is not intended to confine the invention to the particular form of embodiment disclosed herein, for it is susceptible of embodiment in various other forms. As an example, the present embodiment of the rate mechanism was disclosed as operating on a basis of using one-cent increments to advance the indicator wheel. It is obvious that the increment may be of any value, such as five cents. In this case, the unit indicator wheel would be provided with indicia of five and zero alternately, with the transfer operation involving the tens indicator wheel occurring after every second operation of the unit indicator wheel. It is obvious from this that many other modifications may be made, depending on the requirements governing the use of the rate mechanism.

What is claimed is:

1. In an apparatus of the class described, the combination of a plurality of rotatable members having indicia thereon; means for rotating said members including a solenoid for actuating said means; means for controlling the operation of said solenoid at a predetermined rate including a plurality of disks mounted for rotation, each disk having located on its edge a predetermined number of notches; switching means for energizing said solenoid when actuated; means associated with each of said disks for sensing said notches and operable to actuate said switching means when in a sensing position; and means for controlling the number of notches sensed in a predetermined length of time including means for driving said disk at a speed based on said predetermined length of time and key means having slots therein, said key means being insertable to a position adjacent said sensing means such that the sensing means adjacent the non-slotted portion of said key means are disabled from moving to a sensing position while the sensing means registering with the slotted portions are operable to sense the notches of their associated disks, thereby operating the rotatable members at a rate commensurate with the number of notches sensed and the rotational speed of the disks, said rate varying with the position of the slots located on the key means, thus enabling a plurality of slotted keys to selectively provide a plurality of different rates.

2. In an apparatus of the class described, the combination of a rotary member having indicia thereon; means for driving said rotary member including a solenoid; means for energizing said solenoid including a plurality of control disks mounted for rotation, each disk containing a predetermined number of control surfaces on its edge; sensing means associated with each control disk for sensing said control surfaces, said sensing means operable to energize said solenoid upon sensing of a control surface; and means for controlling the number of control surfaces sensed during a predetermined length of time including means for driving said control disks at a predetermined speed and a slotted key means, said key means being insertable into the apparatus to a position adjacent said sensing means such that the sensing means adjacent the non-slotted portion of said key means are blocked from a sensing position while the sensing means registering with the slotted portion of said key means are operable to sense the control surfaces of the associated disks, whereby the number of control surfaces sensed by the sensing means is controlled by the positioning of the slots on the key, thus allowing for the changing of the rate by the insertion of a key with different positioned slots.

3. In a rate-computing apparatus comprising in combination a plurality of counters; means for driving said counters including a solenoid; means for energizing said solenoid at a predetermined time rate including a plurality of control disks coaxially mounted for rotation, each control disk having a predetermined number of control surfaces located on its edge, said control surfaces being so positioned as not to overlap any other control surface of any other control disk; sensing means associated with each control disk for sensing the disk's control surfaces, said sensing means operable to energize said solenoid upon sensing of a control surface; and means for controlling the number of control surfaces sensed during a predetermined length of time including means for driving said control disks at a predetermined speed and a slotted key means insertable into the apparatus between the sensing means and their associated control disks such that those sensing means adjacent the non-slotted portion of the key means are blocked from a sensing position while those sensing means registering with the slotted portion of the key means are operable to sense the control surfaces of their associated disks, thereby energizing the solenoid to drive the counters.

4. A computing apparatus comprising in combination with a motor means a series of control disks rotated by the motor means at a given time rate, each control disk having a predetermined number of control surfaces located thereon; a plurality of counter wheels; means for operating said counter wheels; a plurality of sensing means, one for each control disk, for sensing said control surfaces, each sensing means being independently operable for actuating said operating means when sensing a control surface; and key means for controlling the number of control surfaces to be sensed, said key means containing a predetermined number of slots such that when said key means is positioned adjacent said sensing means, only those sensing means registering with said slots will be operable, thereby operating the counter at a rate commensurate with the number of control surfaces sensed and the speed of the control disks, said rate varying with the position of the slots on the key means, thus enabling a number of slotted keys to selectively provide a number of different rates.

5. A computing apparatus comprising in combination a series of control disks coaxially mounted for rotation, each control disk having a number of control surfaces positioned thereon in such a manner that no control surface of one disk overlaps the position of a control surface located on another disk; a plurality of counter wheels; means for operating said wheels; sensing means associated with each control disk for sensing the control surfaces on said disk, each of said sensing means being independently operable for actuating said operating means when sensing a control surface; and means for controlling the number of control surfaces to be sensed during a predetermined length of time including means for driving said control disks at a predetermined speed and key means positioned adjacent said sensing means, said key means containing a predetermined number of slots such that only those sensing means registering with the slots in said key means will be capable of sensing the control surfaces of its associated control disk, thereby operating the counters at a rate commensurate with the number of control surfaces sensed and the rotational speed of the control disks.

6. In an apparatus of the class described, the combination of a counter having a plurality of wheels mounted for rotation; a solenoid operable when energized for rotating said counters; switching means operable for energizing said solenoid; a plurality of control disks, coaxially mounted and each containing a predetermined number of notches located on its edge, each notch being so positioned as not to overlap any other notch of any other disk; means associated with each of said control disks for sensing the notches on said disk, each of said sensing means being mounted for independent operation and operable for actuating said switching means when sensing a notch in the control disk; and means for controlling the number of notches to be sensed during a predetermined length of time including a timing motor for driving said control disks at a predetermined speed and a key having longitudinal slots located thereon in a predetermined position, said key being insertable into the apparatus to a position between the control disks and their associated sensing means such that only those sensing means registering with the slotted portion of said key will operate to sense the notches of their associated disks, thereby rotating said counters at a rate commensurate with the number of notches sensed and the rotational speed of the disks, said rates varying with the positioning of the slots located on the key, thus enabling a plurality of keys, each having differently located slots, to selectively provide a plurality of different rates.

References Cited in the file of this patent
UNITED STATES PATENTS

| | | |
|---|---|---|
| 1,340,435 | Bryce | May 18, 1920 |
| 2,903,529 | Hanthorn | Sept. 8, 1959 |